(12) United States Patent
Wang et al.

(10) Patent No.: US 11,840,862 B2
(45) Date of Patent: Dec. 12, 2023

(54) AUTO-LOCK FUNCTION FOR CHASSIS SECURITY BEZEL

(71) Applicant: DELL PRODUCTS L.P., Round Rock, TX (US)

(72) Inventors: Alan Yi Wang, Taipei (TW); Hung-Wen Wu, New Taipei (TW)

(73) Assignee: DELL PRODUCTS L.P., Round Rock, TX (US)

( * ) Notice: Subject to any disclaimer, the term of this patent is extended or adjusted under 35 U.S.C. 154(b) by 777 days.

(21) Appl. No.: 16/531,383

(22) Filed: Aug. 5, 2019

(65) Prior Publication Data
US 2021/0040774 A1 Feb. 11, 2021

(51) Int. Cl.
E05B 15/10 (2006.01)
E05B 47/06 (2006.01)
E05B 17/22 (2006.01)

(52) U.S. Cl.
CPC ............ E05B 15/101 (2013.01); E05B 17/22 (2013.01); E05B 47/0607 (2013.01)

(58) Field of Classification Search
CPC ...... E05B 15/101; E05B 17/22; E05B 65/006; Y10T 292/1045; Y10T 292/1044; Y10T 292/1052; Y10T 292/1075; Y10T 292/1051; Y10T 292/1062; Y10T 292/1043; Y10T 292/11; E05C 3/004
See application file for complete search history.

(56) References Cited

U.S. PATENT DOCUMENTS

| 7,225,235 B2 | 5/2007 | Garnett et al. |
| 9,683,392 B1 | 6/2017 | Cheng et al. |
| 10,147,984 B2 | 12/2018 | O'Hora |
| 2002/0089190 A1* | 7/2002 | Wang ............... E05B 63/244 292/195 |
| 2008/0179894 A1* | 7/2008 | Chuang ............... E05C 3/06 292/109 |
| 2016/0319571 A1 | 11/2016 | Johnson |

FOREIGN PATENT DOCUMENTS

| CA | 2912892 C | 5/2018 |
| CN | 2478469 Y | 2/2002 |
| CN | 1690346 A | 11/2005 |
| CN | 106647973 A | 5/2017 |
| EP | 1286265 A2 | 2/2003 |
| WO | 2018231932 A1 | 12/2018 |

* cited by examiner

*Primary Examiner* — Mark A Williams
(74) *Attorney, Agent, or Firm* — Jackson Walker LLP; Christopher J. Rourk

(57) ABSTRACT

An equipment assembly is disclosed that includes a first equipment housing having a first penetration, a latch assembly disposed within the first equipment housing, a second equipment housing having a second penetration and a security bezel configured to cause the latch assembly to rotate through the first penetration and the second penetration.

20 Claims, 6 Drawing Sheets

AUTO-LOCK FUNCTION FOR CHASSIS SECURITY BEZEL

TECHNICAL FIELD

The present disclosure relates generally to equipment chassis, and more specifically to an auto-lock function for a chassis security bezel that prevents unauthorized removal and potential damage to chassis components.

BACKGROUND OF THE INVENTION

Equipment chassis usually include features that are needed to protect internal components, such as security bezels. However, malicious actors can easily defeat these security bezels, and negligent actors can inadvertently damage the internal components with these security bezels.

SUMMARY OF THE INVENTION

An equipment assembly is disclosed that includes a first equipment housing that has a first penetration and a latch assembly disposed within the first equipment housing. A second equipment housing has a second penetration, and a security bezel is configured to cause the latch assembly to rotate through the first penetration and the second penetration, such as when it is installed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
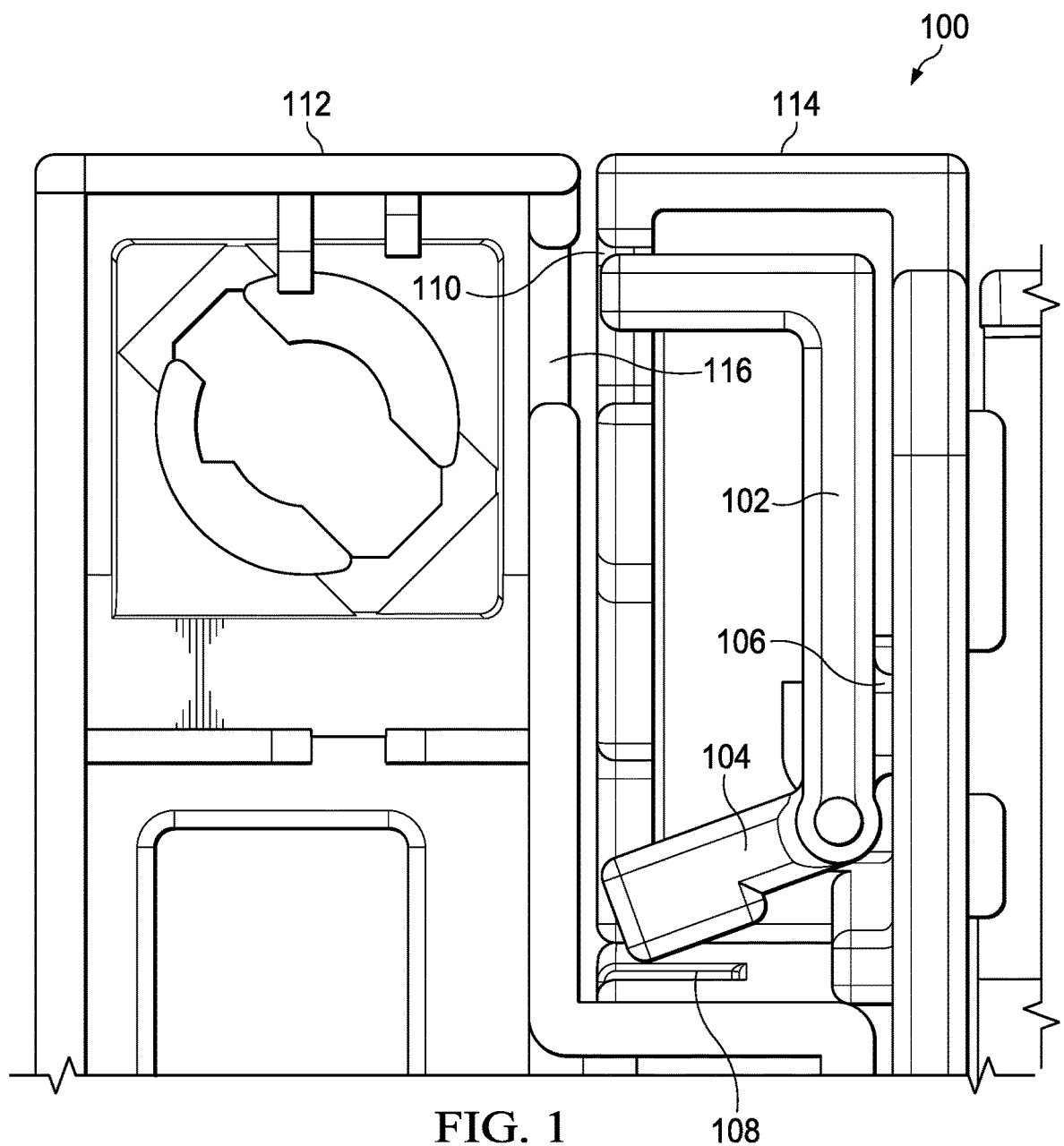
FIG. 1 is a diagram of a chassis latch assembly with a security bezel, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

In many equipment chassis that include a security bezel, a user can still can pull out the internal components, such as hard disk drive (HDD) bays, and access all of the internal components. Depending on its design, a security bezel might only protect some of the internal components, but not be capable of protecting all of the internal components.

The present disclosure provides a structure that can lock an internal release latch in parallel with the assembly of a security bezel. In one example embodiment, the structure can be a bar that has a first unlocked configuration, and when assembled with a security bezel, a security bezel aligned pin can be used to push the bar so as to cause it to rotate and lock a release latch and associated locking structure. The disclosed embodiments provide a double lock function that results in improved security for internal components.

For current products, one solution is to use two screws to fix two side latches, where the latch doesn't provide any function before it is assembled into the security bezel. Another solution is to provide one latch locked clip to constrain one side in a latch operation before the security bezel is assembled. These two approaches result in the same problem, which is that customers need to perform extra operations to lock a release latch. If the customer forgets to lock the release latch, the security bezel will not be able to protect the internal components. The present disclosure recognizes this previously unrecognized problem and provides a solution that does not increase the cost, complexity or space requirements for a secure locking device, and which does not substantially impact the manufacturability of the secure locking device. For example, placing the entire equipment enclosure in a locked bay can provide some protection against theft, but the cost of that configuration is excessive, and can result in increased heating and equipment damage due to decreased air flow.

FIG. 1 is a diagram 100 of a chassis latch assembly 102 with a hard disk drive 114, in accordance with an example embodiment of the present disclosure. Diagram 100 includes chassis latch assembly 102, swivel 104, actuator 106, slot 108, penetrations 110 and 116, right ear assembly 112 and hard disk drive 114, as well as other suitable components.

Chassis latch assembly 102 can be formed from metal, plastic, elastomeric, rubber, other suitable materials or a suitable combination of materials, and can be fabricated as an L-shaped structure with a beveled edge or in other suitable manners. Chassis latch assembly 102 is coupled to swivel 104 and actuator 106, and can rotate when pushed by actuator 106 so as to extend from penetration 110 into penetration 116.

Swivel 104 can be formed from metal, plastic, elastomeric, rubber, other suitable materials or a suitable combination of materials, and can be fabricated as an extension from chassis latch assembly 102 with a beveled edge or in other suitable manners. Swivel 104 is coupled to chassis latch assembly 102 and rotates cooperatively with chassis latch assembly when actuator 106 causes chassis latch assembly 102 to rotate. Swivel 106 rotates into slot 108, which is configured to constrain the operation of swivel 104.

Actuator 106 can be formed from metal, plastic, elastomeric, rubber, other suitable materials or a suitable combination of materials, and can be fabricated as an extension from a security bezel or in other suitable manners. Actuator 106 extends from a security bezel that is configured to cause actuator 106 to rotate when the security bezel is installed.

Penetration 110 can be formed from metal, plastic, elastomeric, rubber, other suitable materials or a suitable combination of materials, and can be fabricated to contain chassis latch assembly 102 or in other suitable manners. In one example embodiment, penetration 110 is formed in hard disk drive 114 to allow chassis latch assembly 102 to extend into right ear assembly 112, so as to lock right ear assembly 112 in position adjacent to hard disk drive 114.

Right ear assembly 112 can be formed from metal, plastic, elastomeric, rubber, other suitable materials or a suitable combination of materials, and can be fabricated to receive hard disk drive 114 or in other suitable manners. Right ear assembly 112 can be part of a combined chassis assembly, such as for multiple hard disk drive chassis that have a single security bezel, or other suitable assemblies.

Hard disk drive 114 can be formed from metal, plastic, elastomeric, rubber, other suitable materials or a suitable combination of materials, and can be fabricated to receive hard disk drive 114 or in other suitable manners. Hard disk drive 114 can be part of a combined chassis assembly, such as for multiple hard disk drive chassis that have a single security bezel, or other suitable assemblies.

Penetration 116 can be formed from metal, plastic, elastomeric, rubber, other suitable materials or a suitable combination of materials, and can be fabricated to receive chassis latch assembly 102 when it is deployed from an unlocked position to a locked position, or in other suitable manners.

In operation, a user actuates chassis latch assembly 102 to lock hard disk drive 114 to right ear assembly 112 by installing a security bezel so as to cause actuator 106 to rotate chassis latch assembly 102. The automatic actuation of chassis latch assembly 102 when the security bezel is installed secures the hard disk drive 114 to the right ear assembly 112. Likewise, when the security bezel is removed, chassis latch assembly 102 can rotate back into a rest position, such as by using a spring or in other suitable manners.

Figure 2:
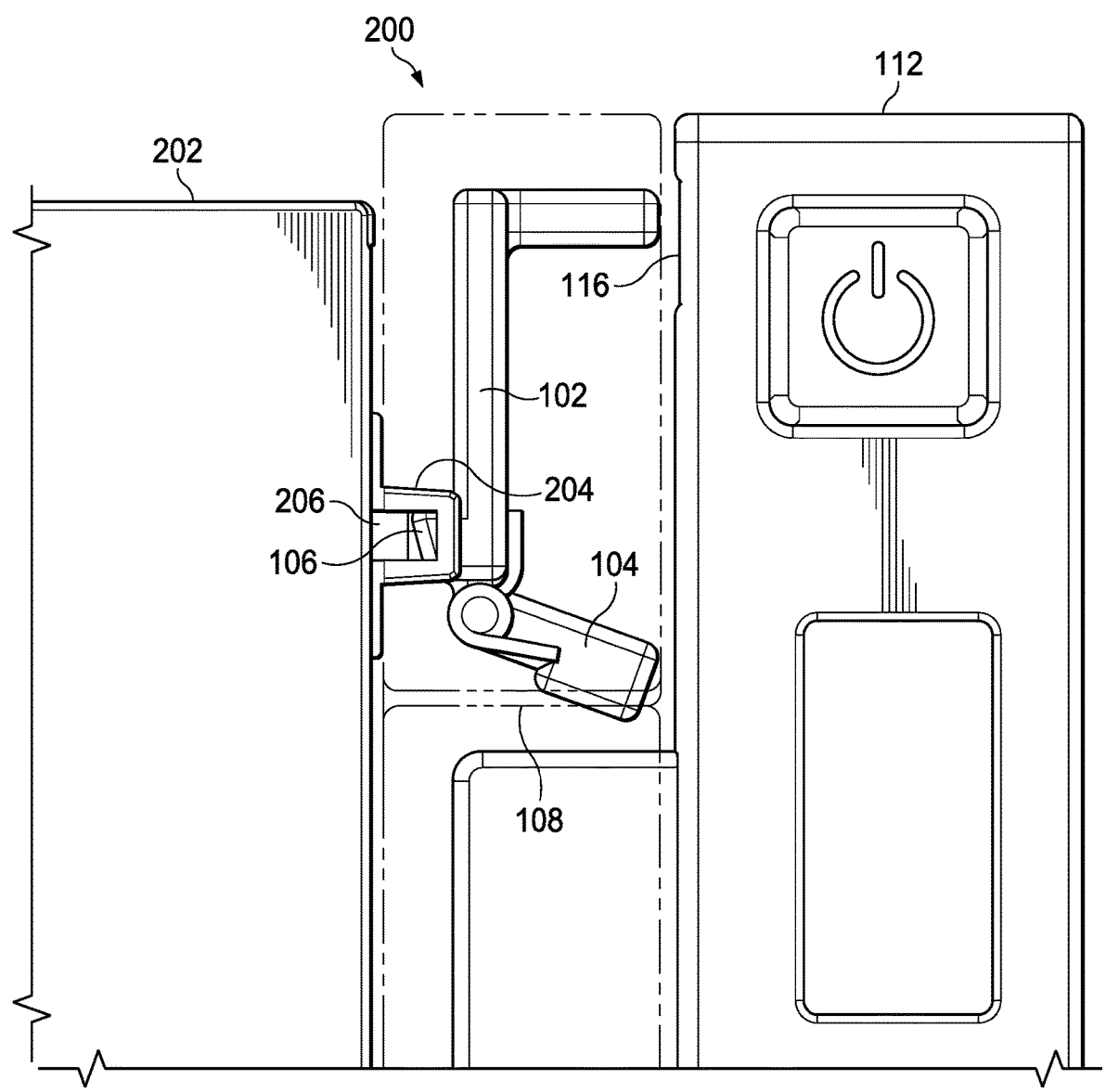
FIG. 2 is a diagram of an alternate view of a chassis latch assembly with a security bezel, in accordance with an example embodiment of the present disclosure.

FIG. 2 is a diagram 200 of an alternate view of a chassis latch assembly 102 with a security bezel 202, in accordance with an example embodiment of the present disclosure. Security bezel 202 includes actuator 106, tab 206 and tab housing 204. Tab 206 can be extended to cause actuator 106 to rotate chassis latch assembly 102. In addition, swivel 104 locks into slot 108 and chassis latch assembly 102 locks into penetration 116 of right ear assembly 112, as previously discussed.

Figure 3A:
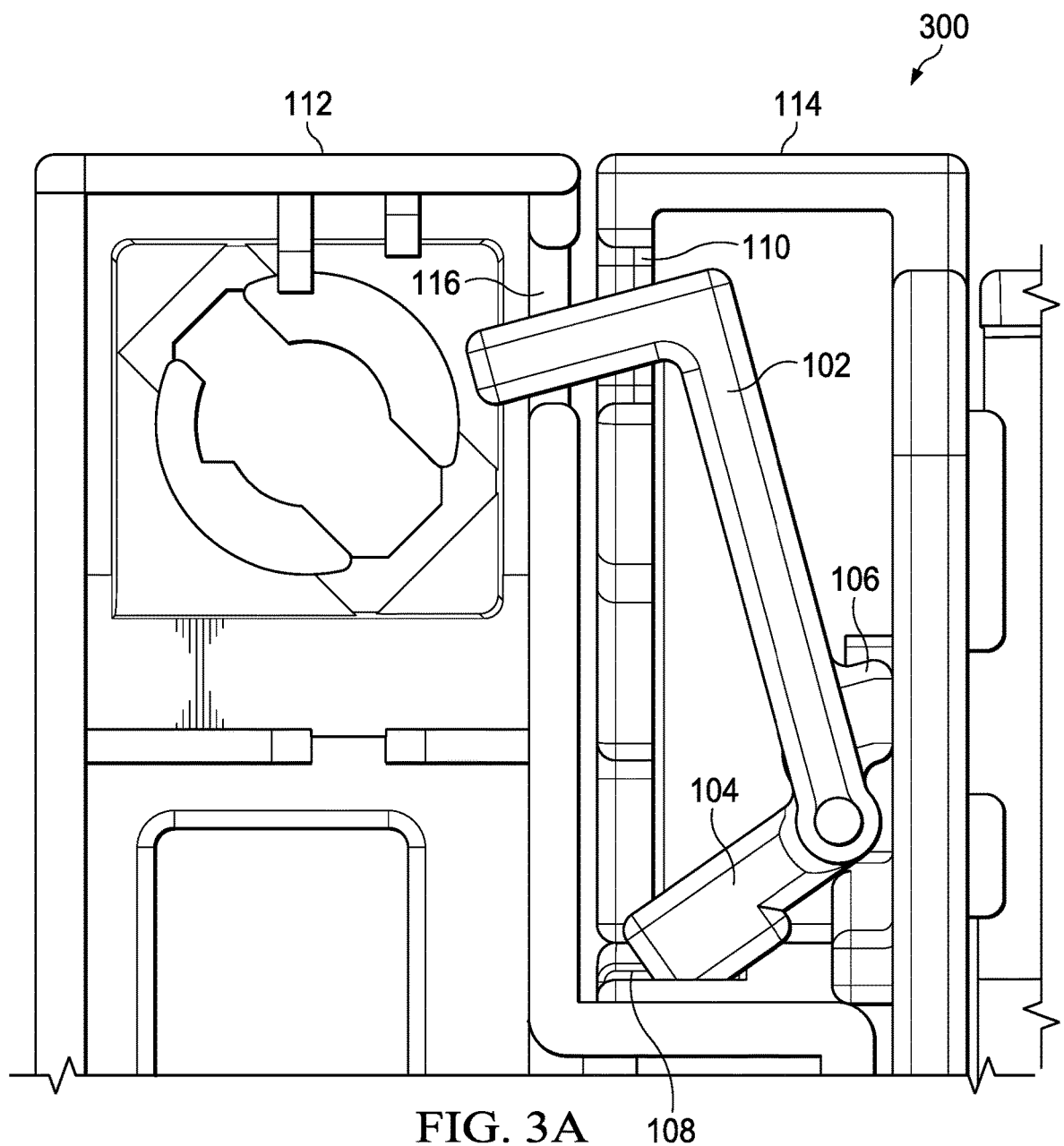
FIGS. 3A and 3B are diagrams of a deployed chassis latch assembly with a security bezel, in accordance with an example embodiment of the present disclosure.
Figure 3B:
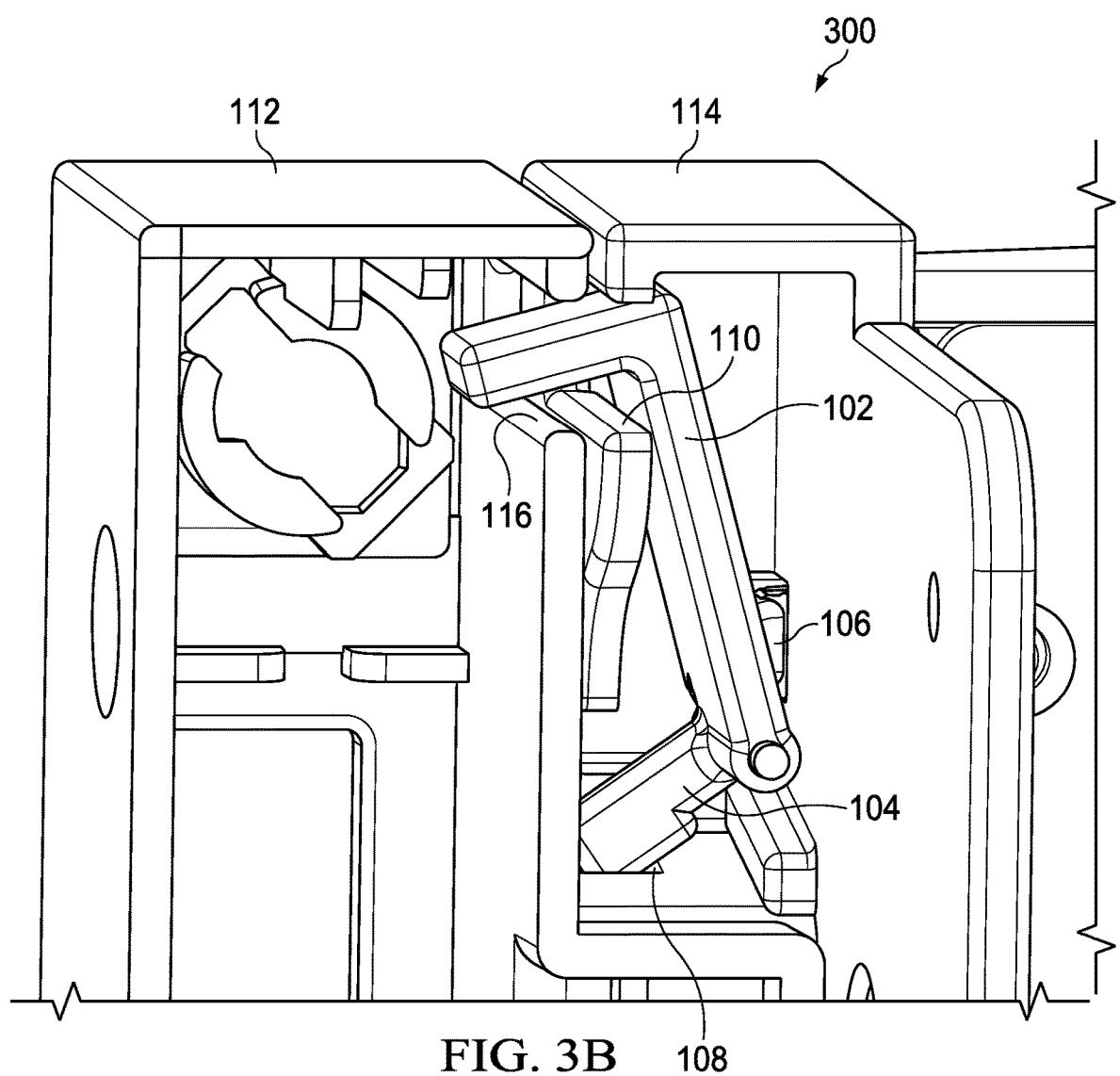

FIGS. 3A and 3B are diagrams 300 of a deployed chassis latch assembly 102 with a hard disk drive 114, in accordance with an example embodiment of the present disclosure. As shown in FIGS. 3A and 3B, tab 206 has been extended to cause actuator 106 to rotate chassis latch assembly 102. Swivel 104 has locked into slot 108 and chassis latch assembly 102 has locked into penetration 116 of right ear assembly 112.

Figure 4:
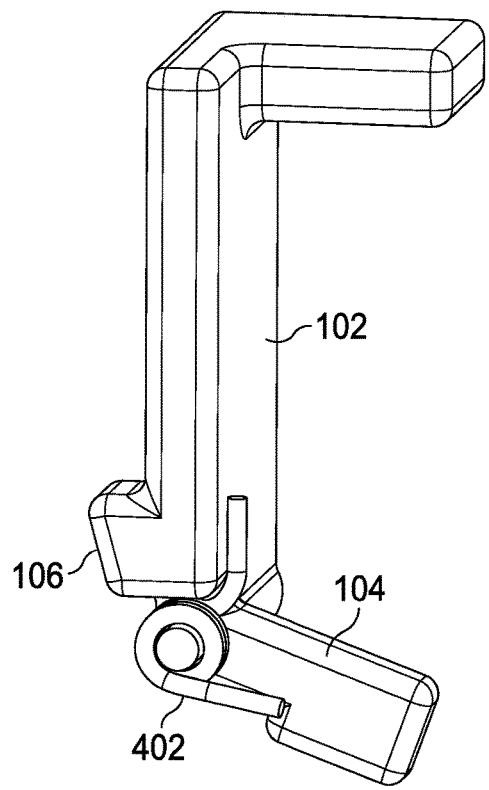
FIG. 4 is a diagram of a chassis latch assembly, in accordance with an example embodiment of the present disclosure.

FIG. 4 is a diagram of a chassis latch assembly 102, in accordance with an example embodiment of the present disclosure. Chassis latch assembly 102 is coupled to swivel 104, and spring 402 is disposed around an axle and causes a restoring force to be applied to chassis latch assembly 102 when tab 206 is removed from actuator 106, such as when a security bezel 202 has been removed or in other suitable manners. Chassis latch assembly 102 as shown is L-shaped, and can include a first short section that is disposed 90 degrees from a second longer section. The longer section can be coupled to swivel 104 and actuator 106, chassis latch assembly 102 can be integrally formed with swivel 104 and actuator 106, or other suitable configurations can also or alternatively be provided. The longer section of chassis latch assembly 102 can be wider than the shorter section. The shorter section of chassis latch assembly can be disposed in a plane that is offset from and parallel to a plane in which swivel 104 is disposed. The shorter section of chassis latch assembly can be disposed in a plane that is offset from and parallel to a plane in which actuator 106 is disposed. The swivel 104 can be disposed in a plane that is offset from and parallel to a plane in which actuator 106 is disposed. Actuator 106 can be disposed 90 degrees from the longer section of chassis latch assembly 102. Swivel 104 can be disposed greater than 90 degrees from the longer section of chassis latch assembly 102. Other suitable dimensions, angles, planar dispositions, configurations and arrangements can also or alternatively be used, with the disclosed embodiments being provided as a non-limiting example that can be modified as suitable consistent with the teachings of the present disclosure. For example, chassis latch assembly 102 can have legs of equal length, can have legs that are disposed at an angle of other than 90 degrees, can include additional components other than those shown, can have components disposed in the same plane instead of in different planes, can have rounded edges, non-beveled edges or other suitable edges and so forth.

Figure 5:
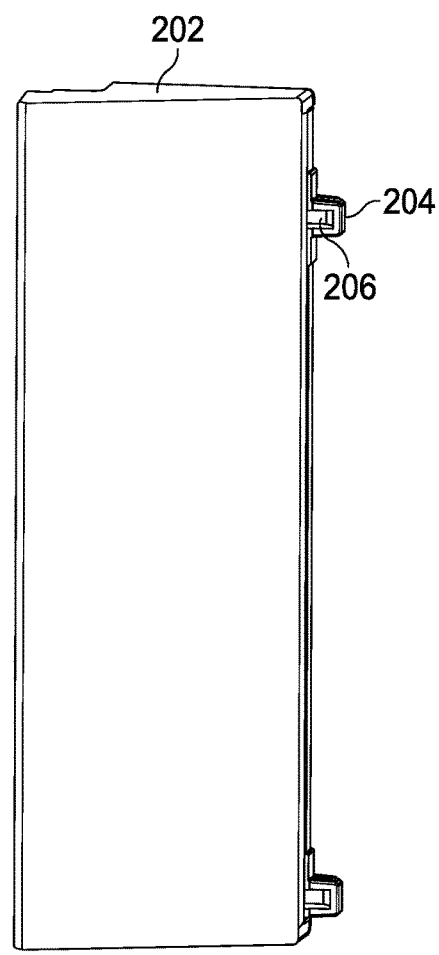
FIG. 5 is a diagram of a security bezel, in accordance with an example embodiment of the present disclosure.

FIG. 5 is a diagram of a security bezel 202, in accordance with an example embodiment of the present disclosure. Security bezel 202 can be formed from metal, plastic, elastomeric, rubber, other suitable materials or a suitable combination of materials, and can be fabricated so as to cause tab 206 to interact with chassis latch assembly 102 in a manner that causes chassis latch assembly 102 to rotate when it is deployed, or in other suitable manners.

Figure 6:
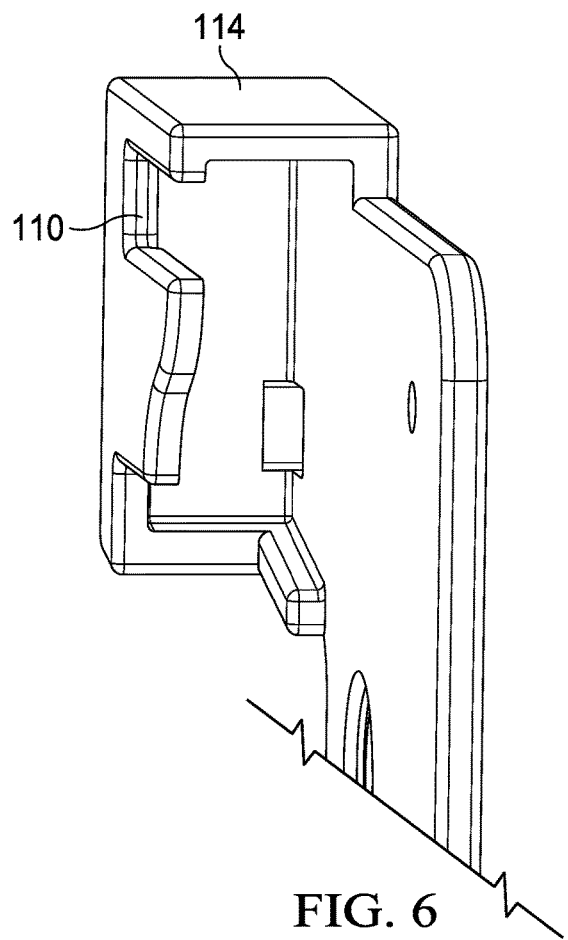
FIG. 6 is a diagram of a right ear assembly, in accordance with an example embodiment of the present disclosure.

FIG. 6 is a diagram of a hard disk drive 114, in accordance with an example embodiment of the present disclosure. Hard disk drive 114 can be formed from metal, plastic, elastomeric, rubber, other suitable materials or a suitable combination of materials, and can include a housing with a penetration 110 that is used to contain chassis latch assembly 102.

Figure 7:
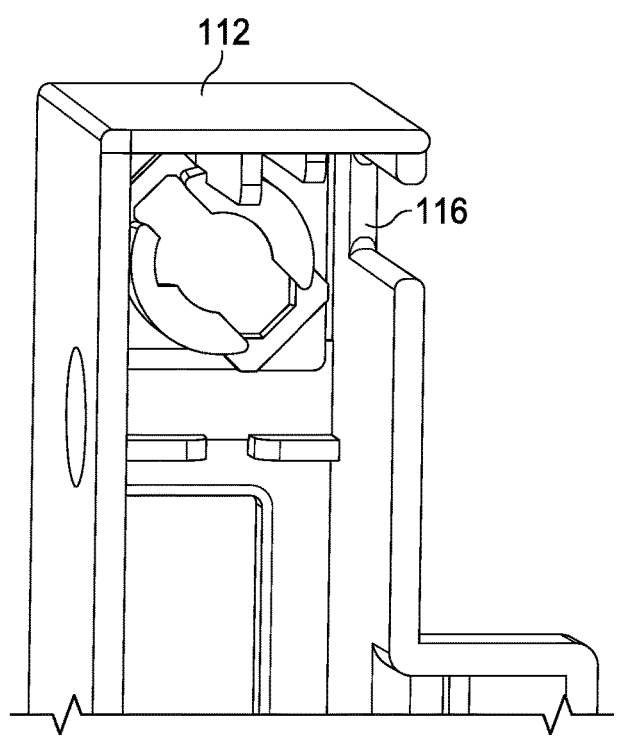
FIG. 7 is a diagram of a hard disk drive, in accordance with an example embodiment of the present disclosure.

FIG. 7 is a diagram of a right ear assembly 112, in accordance with an example embodiment of the present disclosure. Right ear assembly 112 can be formed from metal, plastic, elastomeric, rubber, other suitable materials or a suitable combination of materials, and can be fabricated to receive chassis latch assembly 102 through penetration 116 when it is deployed from an unlocked position to a locked position, or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A computer equipment assembly, comprising:
a first equipment housing having a first penetration;
a latch assembly disposed within the first equipment housing;
a second equipment housing disposed internally to the first equipment housing and the second equipment housing having a second penetration; and
a security bezel, the security bezel being separate from the first equipment housing and the second equipment housing, the security bezel having an extendable tab and the tab configured to interact with an actuator of the latch to automatically cause the latch assembly to rotate through the first penetration and the second penetration when the security bezel is installed and the second equipment housing is disposed internally to the first equipment housing.

2. The equipment assembly of claim 1 further comprising a swivel coupled to the latch assembly, the swivel configured to lock into a slot of the first equipment housing when the latch assembly is rotated through the first penetration and the second penetration by the installation of the security bezel into the first equipment housing.

3. The equipment assembly of claim 1 further comprising a spring coupled to the latch assembly, the spring configured to convey a restoring force to the latch assembly when it is rotated through the first penetration and the second penetration and to restore the latch assembly to an unlatched position when the security bezel is removed.

4. The equipment assembly of claim 1 further comprising the actuator being coupled to the latch assembly, the actuator configured to convey a force from the tab of the security bezel to the latch assembly to cause the latch assembly to rotate when the security bezel is installed.

5. The equipment assembly of claim 1 wherein the latch assembly comprises an L shape.

6. The equipment assembly of claim 1 wherein the latch assembly comprises beveled edges.

7. The equipment assembly of claim 1 wherein the latch assembly comprises an L shape with beveled edges.

8. The equipment assembly of claim 1 wherein the latch assembly comprises a swivel and a spring disposed around an axle.

9. The equipment assembly of claim 1 wherein the latch assembly comprises and a first short section that is disposed 90 degrees from a second longer section.

10. The equipment assembly of claim 9 wherein the longer section is coupled to a swivel and the actuator that is configured to interface with the tab.

11. The equipment assembly of claim 9 wherein the longer section is integrally formed with a swivel and the actuator that is configured to rotate the latch assembly in response to an interaction with the tab.

12. The equipment assembly of claim 9 wherein the longer section is wider than the shorter section.

13. The equipment assembly of claim 9 wherein the shorter section is disposed in a plane that is offset from and parallel to a plane in which a swivel is disposed.

14. The equipment assembly of claim 9 wherein the shorter section is disposed in a plane that is offset from and parallel to a plane in which the actuator that is configured to interact with the tab is disposed.

15. The equipment assembly of claim 9 wherein a swivel is disposed in a plane that is offset from and parallel to a plane in which the actuator that is configured to interact with a tab contained within a tab housing is disposed.

16. The equipment assembly of claim 9 wherein the actuator is disposed 90 degrees from the longer section.

17. The equipment assembly of claim 9 wherein a swivel is disposed greater than 90 degrees from the longer section.

18. The equipment assembly of claim 1 wherein the second equipment housing is an internal component of the first equipment housing.

19. A computer equipment assembly, comprising:
a first equipment housing having a first penetration;
a latch assembly disposed within the first equipment housing;
a second equipment housing of a removable internal component of the first equipment housing, the second equipment housing having a second penetration; and
a security bezel, the security bezel being separate from the first equipment housing and the second equipment housing, the security bezel having a tab and the tab configured to interact with an actuator of the latch to cause the latch assembly to rotate through the first penetration and the second penetration when the security bezel is installed.

20. The equipment assembly of claim 19 wherein the tab is an extendable tab.

* * * * *